(12) United States Patent
Fiocco

(10) Patent No.: US 7,028,374 B2
(45) Date of Patent: Apr. 18, 2006

(54) COUPLING DEVICE FOR DETACHABLE HANDLES FOR POTS AND PANS

(76) Inventor: Maria Grazia Fiocco, Via Trento, 554-I-37020, Dolce'(Verona) (IT)

( * ) Notice: Subject to any disclaimer, the term of this patent is extended or adjusted under 35 U.S.C. 154(b) by 140 days.

(21) Appl. No.: 10/467,498

(22) PCT Filed: Feb. 12, 2002

(86) PCT No.: PCT/IT02/00085

§ 371 (c)(1),
(2), (4) Date: Aug. 7, 2003

(87) PCT Pub. No.: WO02/064005

PCT Pub. Date: Aug. 22, 2002

(65) Prior Publication Data

US 2004/0068845 A1    Apr. 15, 2004

(30) Foreign Application Priority Data

Feb. 14, 2001   (IT) .......................... VR2001A0015

(51) Int. Cl.
*A47J 45/10* (2006.01)
(52) U.S. Cl. ............... 16/422; 16/425; 16/DIG. 24; 16/DIG. 41; 220/759
(58) Field of Classification Search ................ 16/406, 16/422, 425, 426, DIG. 24, DIG. 25, DIG. 41; 220/759; 403/138, 204, 240
See application file for complete search history.

(56) References Cited

U.S. PATENT DOCUMENTS

| | | | | |
|---|---|---|---|---|
| 2,151,276 A | * | 3/1939 | Mattoon | 220/776 |
| 2,395,140 A | * | 2/1946 | Peterson | 294/31.2 |
| 3,272,547 A | * | 9/1966 | Pryce | 294/31.1 |
| 3,474,486 A | * | 10/1969 | Serio et al. | 220/759 |
| 4,032,032 A | * | 6/1977 | Carroll et al. | 220/752 |
| 4,033,010 A | * | 7/1977 | McCalla | 16/422 |
| 4,577,367 A | * | 3/1986 | Durand | 220/759 |
| 4,825,505 A | * | 5/1989 | Witte | 16/425 |
| 5,373,608 A | * | 12/1994 | Welch | 16/425 |
| 5,620,255 A | * | 4/1997 | Cook, III | 374/141 |
| 5,671,504 A | * | 9/1997 | Gou | 16/436 |
| 5,673,458 A | * | 10/1997 | Raoult | 16/425 |
| 5,704,092 A | * | 1/1998 | Nicollet et al. | 16/425 |

FOREIGN PATENT DOCUMENTS

| | | |
|---|---|---|
| AU | 417 138 B | 9/1971 |
| CH | 254 760 A | 5/1948 |
| EP | 0755857 A1 * | 1/1997 |
| FR | 2 207 672 | 6/1974 |
| GB | 490 246 A | 8/1938 |
| GB | 963 357 A | 7/1964 |
| GB | 1 078 089 A | 8/1967 |

* cited by examiner

Primary Examiner—Brian E. Glessner
Assistant Examiner—Michael J. Kyle
(74) Attorney, Agent, or Firm—Greenberg Traurig LLP

(57) ABSTRACT

A coupling device (4) for detachable handles of the type that are fitted to pots, pans, utensils of various kinds or the like, comprising a support (5) having two coupling parts opposite to each other, of which a first part (6) comprises means for fixing to a gudgeon (2) or other similar coupling element integral with the pan (1) and a second part (7), opposite the previous one, comprises means designed to hold the end of a handle (3) or the like. Said means designed for coupling with the gudgeon comprise engaging and/or pressure clamping elements that act on said gudgeon.

16 Claims, 5 Drawing Sheets

COUPLING DEVICE FOR DETACHABLE HANDLES FOR POTS AND PANS

TECHNICAL FIELD

The present application refers to a coupling device for detachable handles similar to those that can be fitted to pots, pans and the like, or to utensils in general.

This is a device which constitutes an evolution, but which differs from a mechanical point of view from a similar gripping element for pots, pans and the like, previously designed by the same applicant, regarding a new concept that makes it possible to attach removable type handles to pots, pans and the like to satisfy practical requirements in the use of these containers, in other words first of all the interchangeability of the pieces.

The present invention aims to achieve at least two advantageous goals: the possibility of using the same handles for various pans and the possibility of storing the containers without their handles, in order to save space which is well-known to be at a premium in kitchens, for example if it is necessary to store the container in a refrigerator, or for cooking in the oven or during dishwashing.

The background art in the household articles sector, and particularly as far as containers for cooking are concerned, includes certain contrivances that makes pots, pans and cooking containers in general more functional as well as of more handy use, at least from the point of view of safety during cooking.

Document GB-A-1078089 describes a coupling device for detachable handles of the type that are fitted to pots, pans, utensils of various kinds or the like, comprising a support (3) having two coupling parts opposite to each other, the first coupling part (4) comprising means for fixing the support to a gudgeon (8) or other similar coupling element integral with the pan, the second coupling part, which is located opposite the first coupling part, comprising means designed to hold the end of the handle (2) or the like, whereby the first coupling means comprise engaging elements that act on said gudgeon. Furthermore, the first part has a groove to engage the corresponding shape of the gudgeon, whereas the second coupling part has a hole for accommodating a screw (9) for securing the handle to the support, coupling means (5,6) are also provided The coupling device described in GB-A-1078089 is clearly featured for stable connection.

Document AU-B-417138 describes means for fixing handles to pans wherein a bracket is secured at one of its ends to be connect d to the pan and the handle is fixed to the other handle supporting end thereof. Said means comprises a tang formed on the handle supporting end of the bracket which is being bifurcated by a slot formed longitudinally therein.

Document CH-A-254760 describes a casserole with a handle which is connected to the body of said casserole by means of a support (5) comprising two lateral wings (6). Screw type clamping means (11, 12) are inserted at approximately right angles with respect to the axis of the gudgeon perforating the same.

Also the coupling devices described in AU-B-417138 and CH-A-254760 are intended to permanently fix the handle to a related cooking utensil.

In particular the need has arisen in this sector to produce removable or detachable handles, and a number of products have been presented on the market that foresee the possibility of using interchangeable handles, although these have proved in some cases to be impractical and in others so complicated and costly as to make them unacceptable or in any case inadequate for market requirements.

A solution conceived by the same applicant (see italian patent application No. VR2000A000103) concerns a coupling system for removable handles of containers in general, capable of overcoming the limitations of the known solutions by means of the implementation of a mechanical principle new to the sector, in other words an eccentric system, which can be used to attach handles to the edges of pots or pans, or to their gudgeon, by means of an eccentric system.

According to the present invention, an evolution of this coupling system for handles is proposed which, in this case, is even more simplified with respect to the solution mentioned above, since a mechanical system is used which, unlike the former solution, must make use of a gudgeon already present on the pan and fixed to the same, but which is safer and easier to use.

The immediate advantage achieved by this innovation is the even greater construction simplicity, with the consequent reduction in production costs, and moreover a certain simplification also from the point of view of its use.

Another advantage of this solution is the fact that the handles with universal couplings already on the market can be attached to the gudgeon, and that it also adapts to the different types of pots and pans of various shapes on the market, without the need to further alter the shapes commonly used in the sector.

The aims and advantages indicated above are all achieved by means of a coupling device for detachable handles of the type that are fitted to pots, pans or the like having the features disclosed in claim 1.

The dependent claims outline advantageous forms of embodiment of the invention.

Additional features and details of the invention will be better understood from the description which follows, given as a non-binding example, referring to the attached drawings in which:

FIG. 1 represents an exploded cross section Bide view of the gudgeon coupling element which also acts as a support for a handle or the like;

FIG. 9 represents an exploded perspective view, slightly from above, of the gudgeon coupling element which also acts as a support for a handle or the like.

With reference to the attached figures, number 1 indicates a pot or pan of the type that comprises a traditional shape gudgeon 2, i.e. generally parallelepiped or other similar shape appropriate to hold a handle or in general a gripping element 3.

According to the invention, the handle 3 is not fixed directly onto the gudgeon 2 but that an intermediate coupling element is used, indicated globally by 4, comprising means for the rapid coupling and uncoupling of the handle with respect to the gudgeon.

This makes it possible to remove or fit the handle 3 very easily as needed, to satisfy for example the various requirements related to the encumbrance having to store the pans in the kitchen cupboards and then use them with the handle when cooking.

Figure 1:
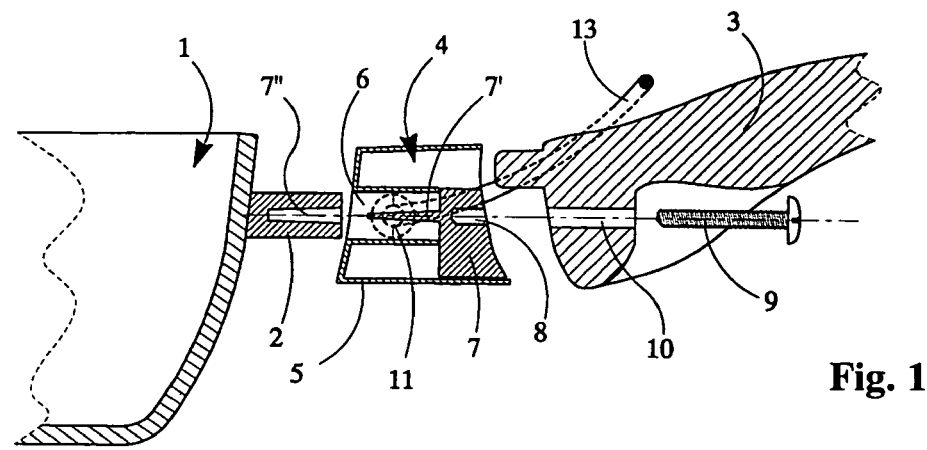
Figure 2:
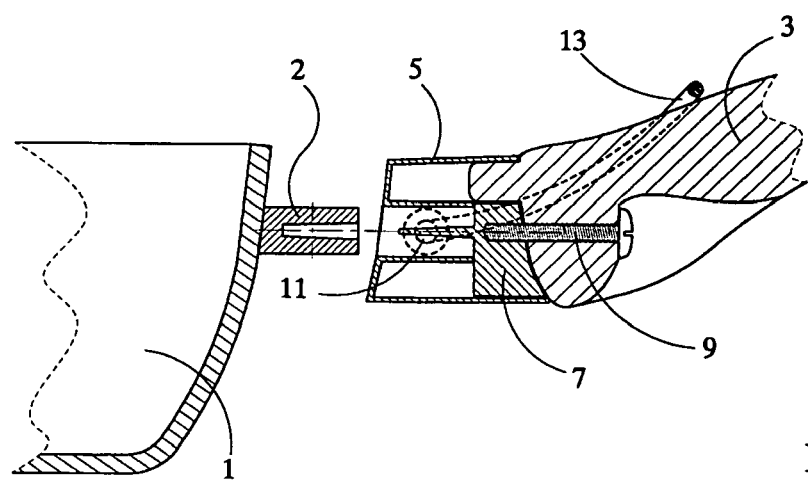
FIG. 2 is the side view of the coupling device on which the handle is fixed.
Figure 3:
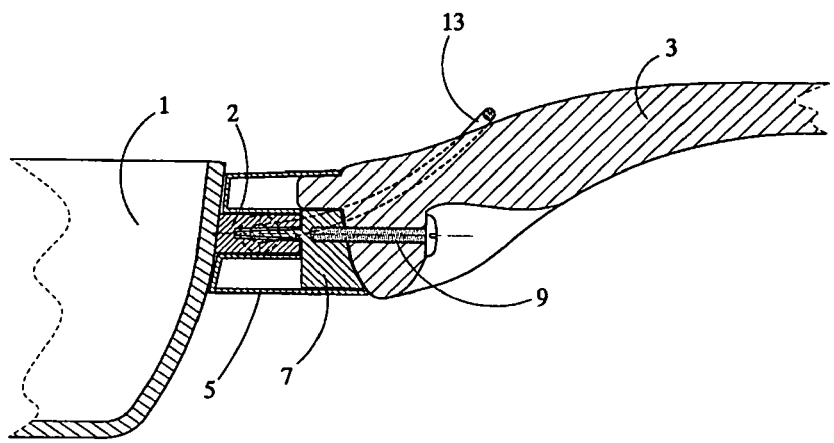
FIG. 3 is the side view of the coupling device on which the handle is fixed and its subsequent fixing to the gudgeon of the pan.

The particularity of the invention is in fact the presence of the coupling element 4, which consists of a substantially hollow support 5 presenting two coupling parts opposite each other; a first part comprising a housing 6 for the gudgeon 2 integral with the pan, and a second part 7, opposite the first, comprising a piece with a threaded housing 8, visible in FIG. 1.

The shape of part 7, which can be equipped with a centering punch 7' designed to be inserted in a corresponding housing 7" already present in the gudgeon 2, is designed to hold the coupling end of a handle or the like, which is fixed by means of a screw 9, inserted in turn in the threaded housing 8, after passing through the hole 10 generally found in the handle.

According to a feature of the invention particular means are provided which clamp the support 5 on the gudgeon. These means comprise clamping elements which, according to a particular embodiment, can be the screw type, indicated with number 11, which are inserted at right angles with respect to the axis of the gudgeon.

Figure 4:
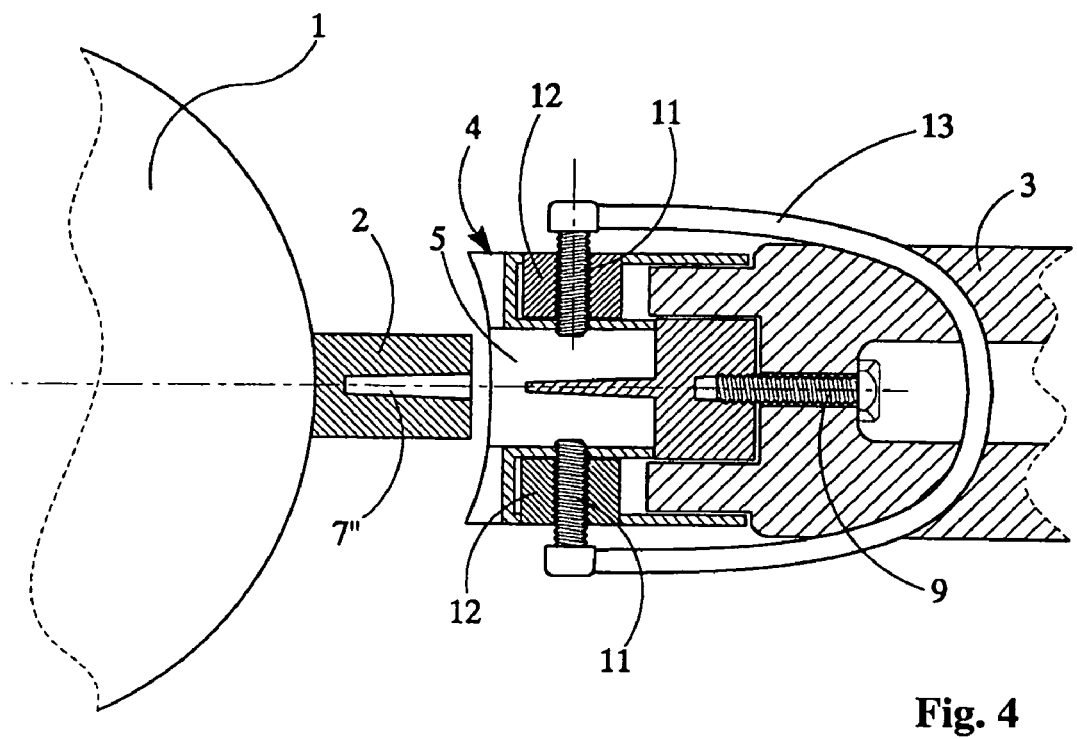
FIG. 4 shows a plan view of the coupling device detached from the gudgeon.
Figure 5:
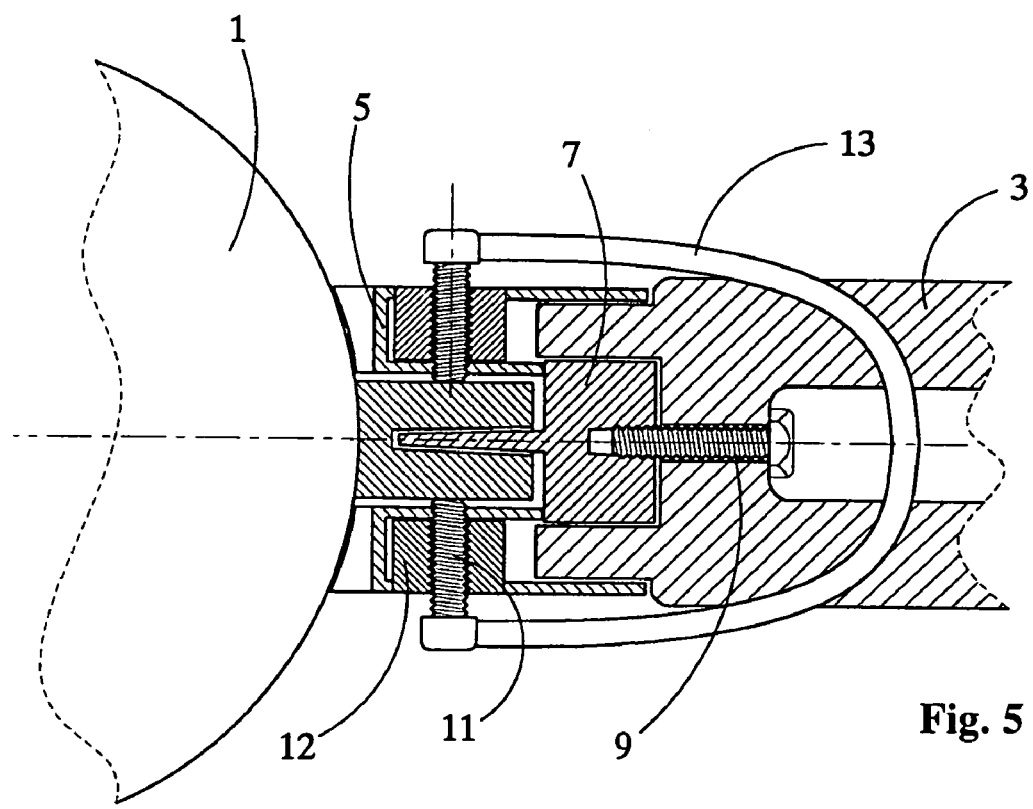
FIG. 5 shows a plan view of the coupling device attached to the gudgeon.
Figure 6:
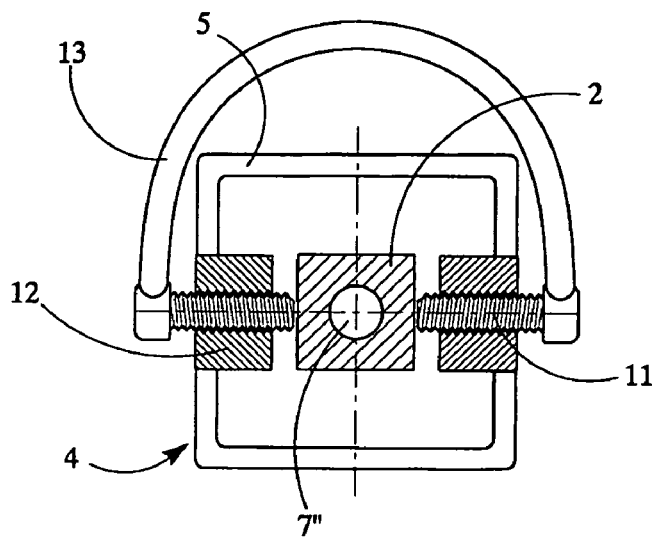
FIG. 6 is a front view of the coupling device.
Figure 7:
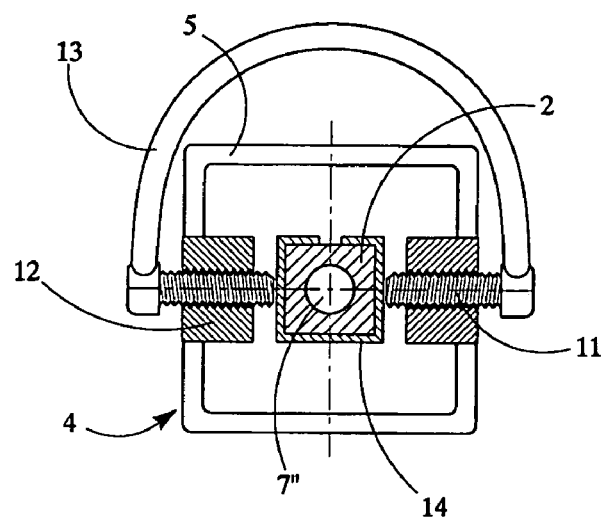
FIG. 7 is a front view of the coupling device, in this case comprising supplementary means for fixing the gudgeon.

In the example shown, there are two screws 11 with opposite threads, i.e. one with a right thread and the other with a left thread, which are inserted in the corresponding threaded housings 12 (FIGS. 4 and 5) integral with the aforesaid support 5.

A lever arm 13 is fixed to the two protruding heads of the screws 11, joining them together and making it possible, by moving the lever arm, to tighten or loosen the screws 11 simultaneously, to clamp or release the support 5 on the gudgeon 2.

It is obvious that the screws 11, having opposite threads, will move away from or closer to the gudgeon to the same extent on both sides, so as to allow the handle 3 to be clamped or released.

The use of the coupling device according to this invention thus provides that the handle 3 is fixed to the support 5 by means of the screw 9 and that the support 5 is then fixed to the gudgeon 2 while the lever arm 13 is in the raised position.

Once the support 5 has been fixed to the gudgeon, it is enough to lower the lever 13 until the parts are fully clamped around the gudgeon from two diametrically opposite directions.

Rather than directly clamping the gudgeon, the two screws 11 with opposite threads can advantageously exert their action by means of an intermediate flexible element 14, made for example of metal, such as steel or aluminium, which surrounds the gudgeon, acting as a protective and clamping element.

Figure 8:
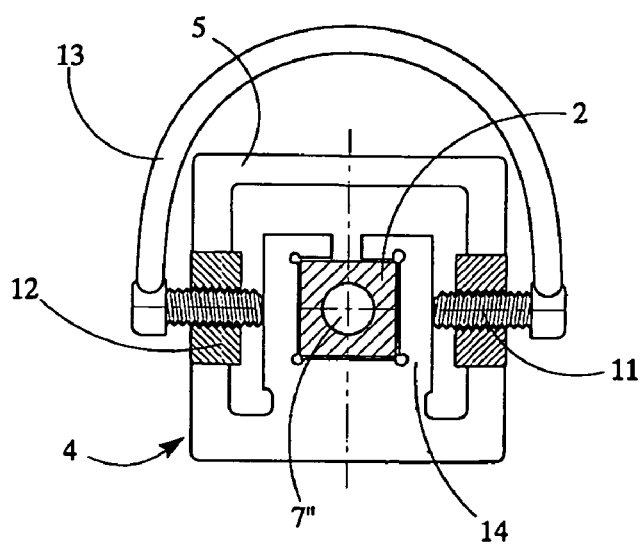
FIG. 8 is a front view of the coupling device, in this case comprising supplementary means for fixing the gudgeon in which the clamping elements are integral with the support element.

According to a particular form of embodiment, this protective element 14 can be integral with the support 5 as shown in the cross section in FIG. 8.

Figure 9:
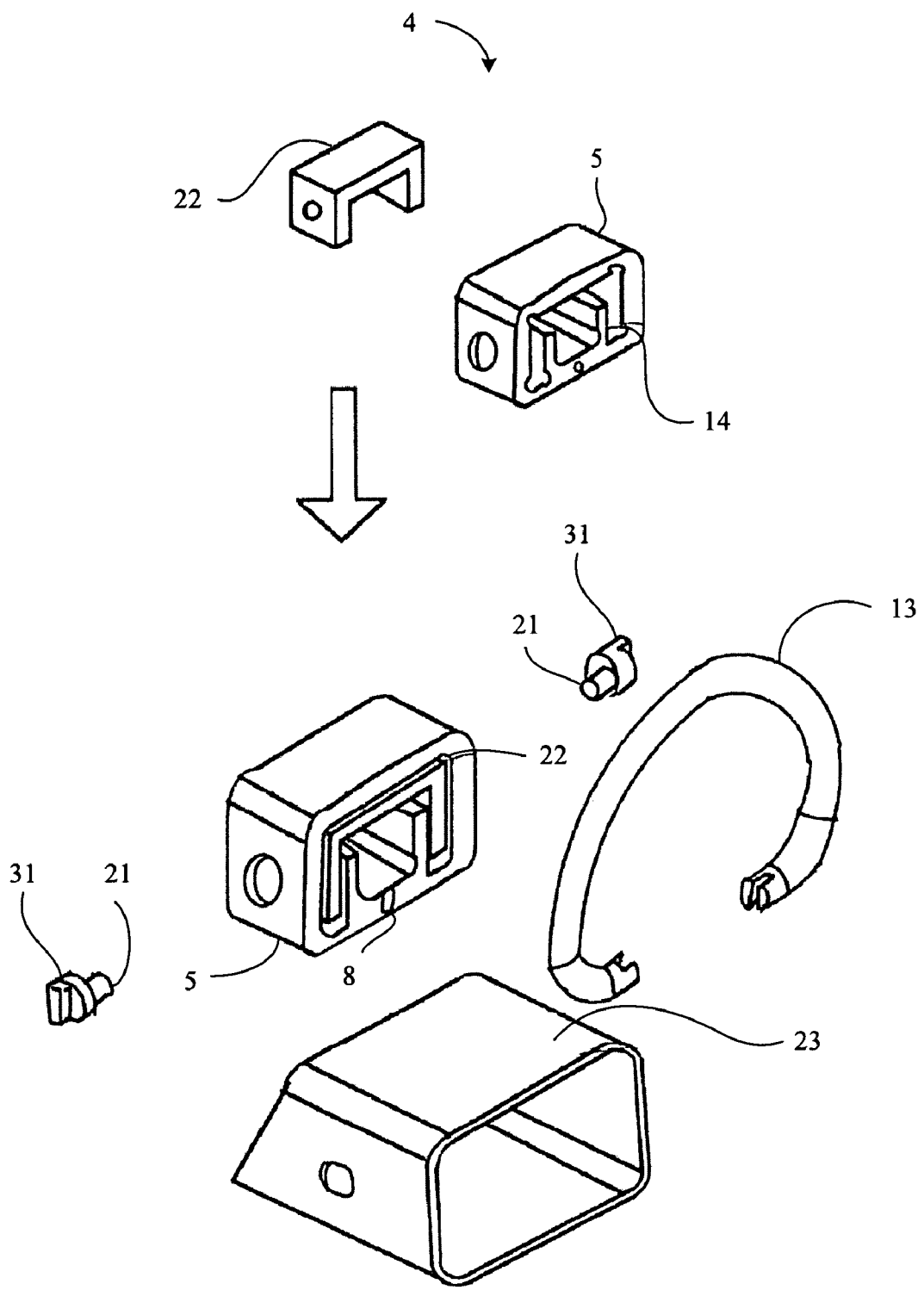

FIG. 9 shows a coupling device in which the clamping means comprise a pair of eccentric pins 31 housed in the intermediate coupling element 4 at the level of the hollow support 5 made for example of an extruded and worked section in aluminum which can be housed inside a metal ring 23 suitable on one side to follow the profile of the pot or pan and the like and on the other side to receive its handle.

The eccentric pins 31 are connected by means of an eccentric tooth 21 to an element 22 that blocks in use the gudgeon to the coupling element 4 rotating said eccentric pins 31.

Figure 10:
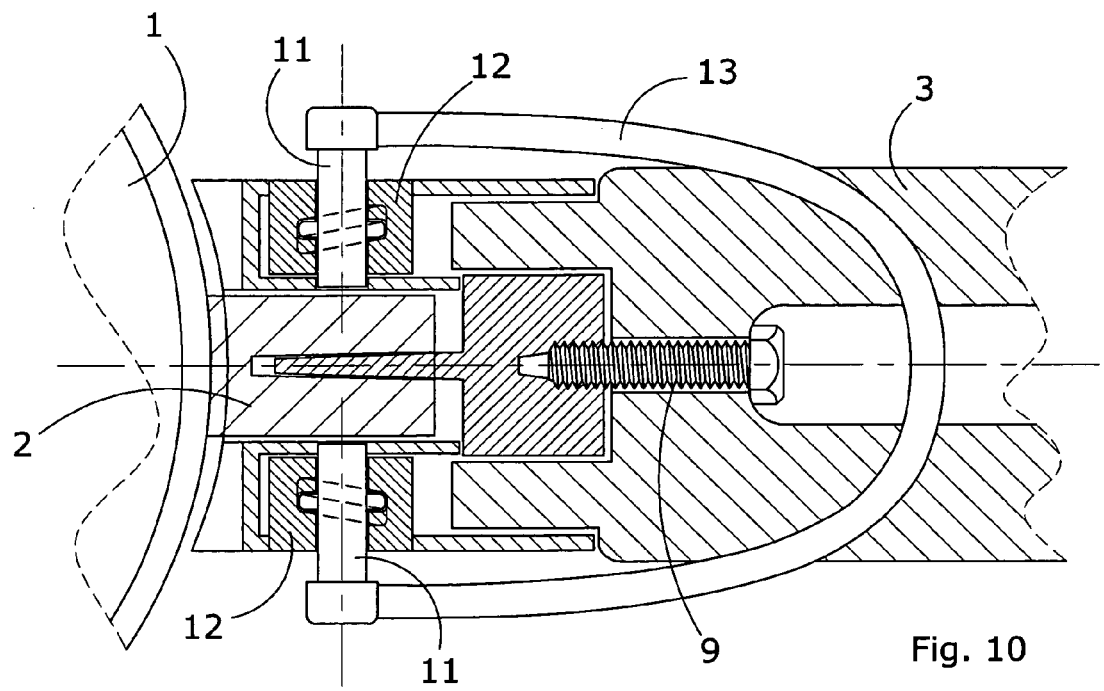
FIG. 10 is a plan view of the coupling device attached to the gudgeon, wherein clamping means is a grub screw.

FIG. 10 shows a coupling device in which instead of the opposite thread screws, a closing system can be used which comprises a grub screw inserted in a rotating pin, which slides in an angled slot cut in the channel, or in the support 12, guiding the pin forwards and backwards, as with screws.

Figure 11:
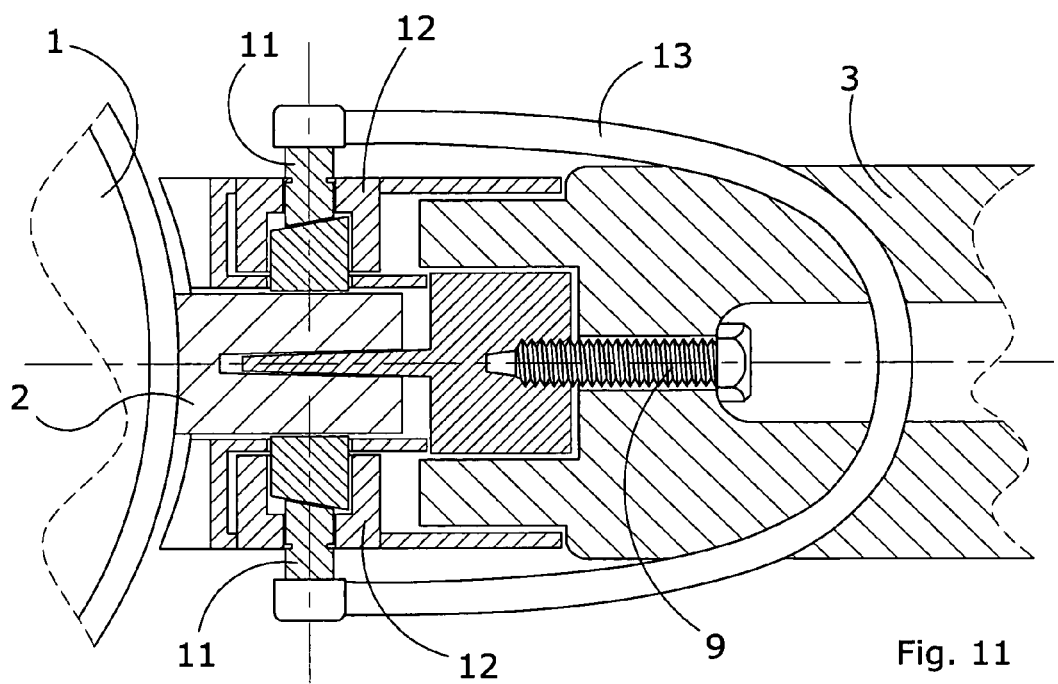
FIG. 11 is a plan view of the coupling device attached to the gudgeon, wherein clamping means is a pair of consecutive cylinders.

FIG. 11 shows a coupling device in which instead of the screws and/or the grub screw sliding in an angled slot, a clamping system can be used which consists of a pair of consecutive cylinders whose contact surfaces are angled according to a cross section on a plane not at right angles with respect to the axis of the cylinders.

Similarly, instead of the screws and/or the grub screw sliding in an angled slot, a clamping system can be used which consists of a pair of consecutive cylinders whose contact surfaces are angled according to a cross section on a plane not at right angles with respect to the axis of the cylinders.

In this case too the reciprocal rotation of the two cylinders, one of which acts as a pivot opposing the other one, allows them to move towards or away from the gudgeon on which they are clamped.

A further possibility is that the clamping system by means of screws/grub screw—angled slot/cylinders with misaligned planes can comprise either elements arranged in opposite pairs with respect to the gudgeon or single elements.

The invention claimed is:

1. A coupling device for detachable handles for pots, pans, or utensils of various kinds, comprising:
    a support with two coupling parts opposite to each other, of which a first part comprises fixing means to a gudgeon to a pan, and a second pan that is opposite to the first part, wherein the second part comprises means designed to hold the end of a handle;
    wherein said fixing means includes at least two clamping elements horizontally rotated inside the support and inserted approximately at right angles with respect to an axis of the gudgeon to clamp or release the support on the gudgeon, thereby exerting a pressure on the body of said gudgeon, said at least two clamping elements being connected to a lever arm acting on the at least two clamping elements in order to clamp or release the support on the gudgeon;
    wherein the at least two clamping elements are threaded screws having opposite threads, one night and one left, the at least two clamping elements being inserted in corresponding threaded housings integral with said support and wherein the lever arm is fixed to the protruding heads of the at least one two clamping elements; and
    wherein moving the lever arm rotates the at least two clamping elements to tighten or loosen the at least two clamping elements thereby clamping or releasing the support on the gudgeon.

2. A coupling device for detachable handles according to claim 1, wherein the at least one clamping element clamp the gudgeon by means of an intermediate flexible element rather than directly.

3. A coupling device for detachable handles according to claim 2, wherein said flexible element is integral with said support.

4. A coupling device for detachable handles according to claim 2 wherein said flexible element is made of metal.

5. A coupling device for detachable handles according to claim 4, wherein said flexible element is made of aluminum or steel.

6. A coupling device for detachable handles according to claim 1, wherein said coupling element comprises a substantially hollow support presenting two coupling parts opposite each other: a first part comprising a housing for coupling with the gudgeon integral with the pan, and a second part, opposite the first, comprising a piece with a threaded housing.

7. A coupling device for detachable handles according to claim 1, wherein the shape of said second part, which is equipped with a centering punch designed to be inserted in a corresponding housing already present in the gudgeon, is designed to hold the coupling end of a handle, which is fixed by a screw, in turn inserted and screwed into the threaded hole after passing through the hole in the handle.

8. A coupling device for detachable handles for pots, pans, or utensils of various kinds, comprising:
  a support with two coupling parts opposite to each other, of which a first part comprises fixing means to a gudgeon to a pan, and a second part that is opposite to the first part, where in the second pan comprises means designed to hold the end of a handle;
  wherein said fixing means is constituted by at least one clamping element horizontally rotated inside the support and inserted approximately at right angles with respect to an axis of the gudgeon to clamp or release the support on the gudgeon., thereby exerting a pressure on the body of said gudgeon, said at least one clamping element being connected to a lever arm acting on the at least one clamping element in order to clamp or release the support on the gudgeon; and
  wherein the at least one clamping element comprises a grub screw inserted in a rotating pin, which slides in an angled slot cut in the support, guiding the rotating pin forwards and backwards.

9. A coupling device for detachable handles, for pots, pans, or utensils of various kinds, comprising:
  a support with two coupling parts opposite to each other, of which a first part comprises fixing means to a gudgeon to a pan, and a second part that is opposite to the first part, where in the second part comprises means designed to hold the end of a handle;
  wherein said fixing means is constituted by at least one clamping element horizontally rotated inside the support and inserted approximately at right angles with respect to an axis of the gudgeon to clamp or release the support on the gudgeon, thereby exerting a pressure on the body of said gudgeon, said at least one clamping element being connected to a lever arm acting on the at least one clamping element in order to clamp or release the support on the gudgeon; and
  wherein the clamping elements comprise a pair of consecutive cylinders whose contact surfaces are angled according to a cross section on a plane not at right angles with respect to the axis of the cylinders.

10. A coupling device for detachable handles according to claim 1, wherein the at least one clamping element comprises elements arranged in opposite pairs with respect to the gudgeon, or elements that act individually with said gudgeon.

11. A coupling device for detachable handles for pots, pans, or utensils of various kinds, comprising:
  a support with two coupling parts opposite to each other, of which a first part comprises fixing means to a gudgeon to a pan, and a second part that is opposite to the first part, where in the second part comprises means designed to hold the end of a handle;
  wherein said fixing means is constituted by at least one clamping element horizontally rotated inside the support and inserted approximately at right angles wit respect to an axis of the gudgeon to clamp or release the support on the gudgeon, thereby exerting a pressure on the body of said gudgeon, said at least one clamping element being connected to a lever arm acting on the at least one clamping element in order to clamp or release the support on the gudgeon; and
  wherein the at least one clamping element comprises a pair of eccentric pins connected trough their eccentric portion to an element blocking in use the gudgeon to the coupling device by rotating eccentric pins.

12. A coupling device for detachable handles according to claim 1, wherein said substantially hollow support presenting two coupling parts opposite each other is an extruded and worked section.

13. A coupling device for detachable handles according to claim 1, wherein said support is housed inside a ring.

14. A coupling device for detachable handles according to claim 3, wherein said flexible element is made of metal.

15. A coupling device for detachable handles according to claim 1 comprising two fastening or clamping elements horizontally rotated inside the support and inserted approximately at right angles with respect to the axis of the gudgeon to clamp or release the support on the gudgeon exerting a pressure on the body of said gudgeon, both connected to an actuating means making possible, by moving the said actuating means, to tighten or loosen simultaneously the elements to clamp or release the support on the gudgeon.

16. A coupling device for detachable handles according to claim 15, wherein the clamping elements, having opposite threads, one right and the other left, will move away from or closer to the gudgeon to the same extent on both sides during their rotation, so as to allow the handle to be clamped or released.

* * * * *